(12) United States Patent
Shigeta

(10) Patent No.: US 6,320,984 B1
(45) Date of Patent: *Nov. 20, 2001

(54) METHOD OF AND APPARATUS FOR EXTRACTING CONTOUR LINE AND WORKSTATION HAVING CONTOUR LINE EXTRACTING FUNCTION

(75) Inventor: Norimasa Shigeta, Minamiashigara (JP)

(73) Assignee: Fuji Photo Film Co., Ltd., Kanagawa-Ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/063,070

(22) Filed: Apr. 21, 1998

(30) Foreign Application Priority Data

Apr. 21, 1997 (JP) .................................................... 9-103528

(51) Int. Cl.⁷ ...................................................... G06K 9/48
(52) U.S. Cl. ............................................ 382/199; 382/201
(58) Field of Search ..................................... 382/197, 199, 382/200, 201, 203, 204, 221, 232, 234, 235, 237, 238, 245; 345/114, 144; 348/468, 473, 586, 600, 465, 460, 474

(56) References Cited

U.S. PATENT DOCUMENTS

| | | | | |
|---|---|---|---|---|
| 4,358,790 | * | 11/1982 | Summers | 358/147 |
| 4,468,808 | * | 8/1984 | Mori et al. | 382/20 |
| 4,703,347 | * | 10/1987 | Yasuda et al. | 358/102 |
| 5,122,784 | * | 6/1992 | Canova | 340/703 |
| 5,532,752 | * | 7/1996 | Miyano | 348/468 |

\* cited by examiner

*Primary Examiner*—Andrew W. Johns
*Assistant Examiner*—Seyed H. Azarian
(74) *Attorney, Agent, or Firm*—Sughrue, Mion, Zinn, Macpeak & Seas, PLLC

(57) ABSTRACT

Contour line data is easily extracted from line drawing data (binary image data). Run data representative of a line drawing compressed according to run-length coding is read line by line, and run data connected to a preceding line is inspected. The run data is divided into blocks in each of which present and preceding lines of run data are connected to each other in one-to-one correspondence, based on an inspected result. Connection information between the blocks of run data is added to the blocks, and the blocks of run data and the connection information are managed as run block data. Left-hand coordinates of the run block data are traced downwardly, and right-hand coordinates of the run block data are traced upwardly for thereby extracting coordinate data (contour line data).

19 Claims, 7 Drawing Sheets

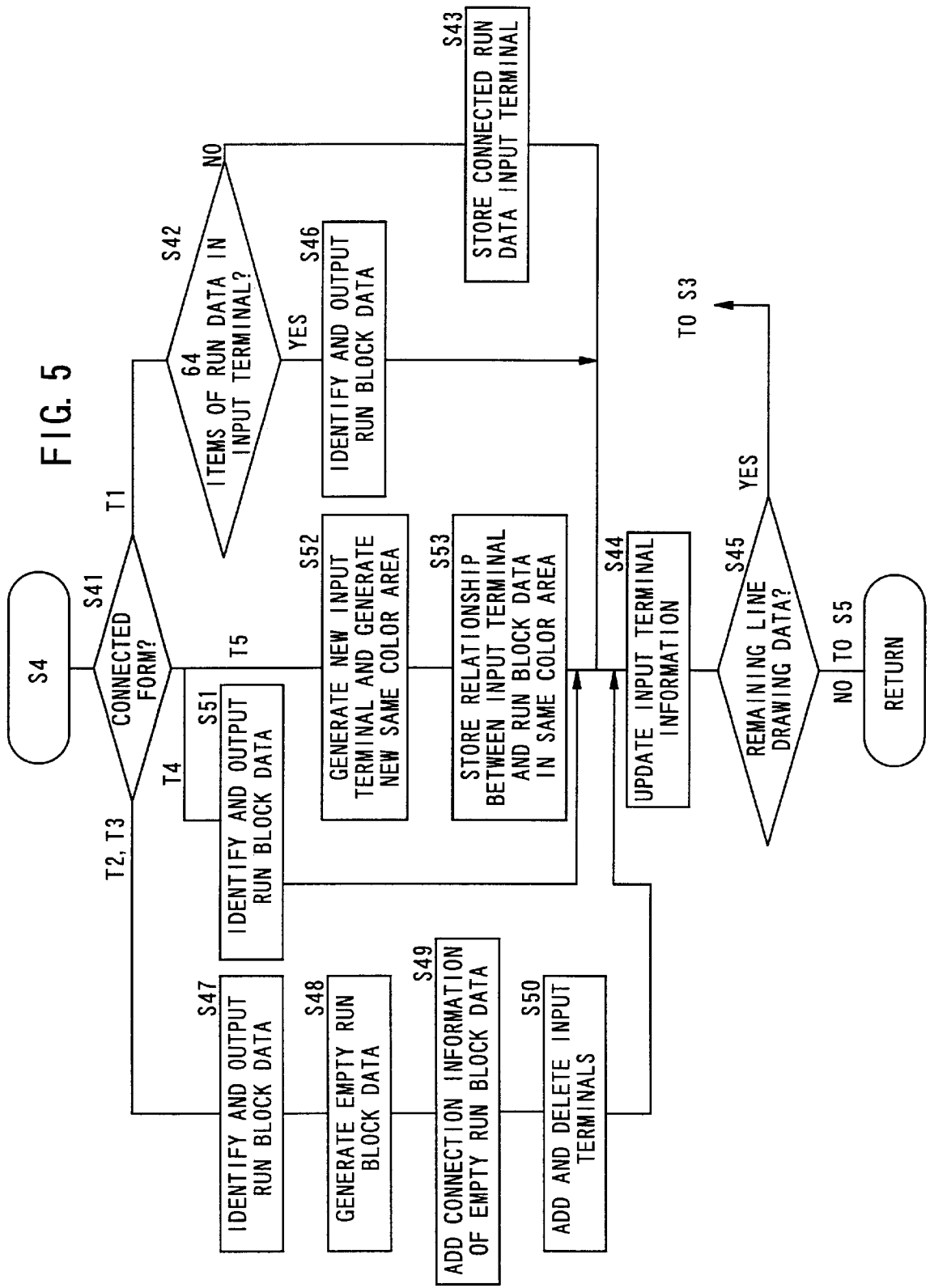

METHOD OF AND APPARATUS FOR EXTRACTING CONTOUR LINE AND WORKSTATION HAVING CONTOUR LINE EXTRACTING FUNCTION

BACKGROUND OF THE INVENTION

1. Field of the Invention

The present invention relates to a method of and an apparatus for extracting a contour line (also referred to as "contour line data") from a line drawing (also referred to as "line drawing data") which represents a binary image (also referred to as "binary image data"), and a workstation with a contour line extracting function.

2. Description of the Related Art

When a contour line is extracted from a line drawing by computerized processing, it is possible to easily generate a line drawing that represents a stressed contour line of the line drawing, e.g., a shadowed character or an outlined character. For stressing a line drawing, it is often necessary to extract a contour line from the line drawing.

For extracting contour line data from line drawing data according to computerized processing, it has heretofore been customary to extract a contour line based on the principles of 8-connected pixels using a 3×3 mask, from bit map data stored in a memory.

One conventional process of extracting contour line data from line drawing data using a 3×3 mask will be described below with reference to FIG. 7 of the accompanying drawings. As shown in FIG. 7, a raster scanning process for looking for a track start point is carried out from an upper left pixel (bit) 4 in a designated area (line drawing data) 2 in a bit map line drawing. In the raster scanning process, every pixel is checked for a pixel value successively horizontally from the upper left pixel 4, and when one line has been checked, one line is shifted downwardly, and every pixel is checked for a pixel value successively horizontally in a next line from a pixel beneath the upper left pixel 4.

In FIG. 7, when a first pixel representing an image is found, i.e., when a pixel whose pixel data has a bit value of 1 (logic 1) is found, that pixel is used as a track start point (also referred to as "track start coordinated" or "track start pixel") 8 for a line drawing (image) 6. Then, the central pixel of the 3×3 mask is aligned with the track start point 8, and mask pixels are checked clockwise or counterclockwise (clockwise in FIG. 7) around the central pixel for their pixel values. If a mask pixel having a bit value of 1, i.e., a mask pixel representing an image, is found in the 3×3 mask, then the found mask pixel is selected and used as a track image coordinate 10.

Then, the central pixel of the 3×3 mask is aligned with the track image coordinate 10. The above cycle is repeated until the central pixel of the 3×3 mask reaches the first image position (pixel position), i.e., the track start point 8, for thereby automatically finding contour line data of an image that is made up of interconnected pixels which are marked with dots.

According to the above process of extracting contour line data by tracking every white/black boundary pixel on the bit map of the line drawing data 2, however, it is necessary to check pixels of about 64 MB if the line drawing data is of an A4 size and has a resolution of 2400 dpi, and pixels of about 256 MB if the line drawing data is of an A2 size. At any rate, the amount of data to be processed is very large. Therefore, the processing of the required data is time-consuming. Furthermore, since the bit map data takes a large memory capacity for storage, the cost of the hardware that is required is also large. These problems are aggravated if the resolution needs to be double because the number of pixels to be handled is four times greater.

For example, extracting contour line data, using a 3×3 mask, from line drawing data which is of an A4 size, has a resolution of 1200 dpi, and contains about 1 MB of pixels whose bit value is 1, takes a hardware arrangement having a certain capability about 90 seconds (one and a half minute) to complete the extracting process. According to a process of using a 3×3 mask, it takes about 400 seconds (a little less than 7 minutes) to extract contour line data from line drawing data which is of an A4 size, has a resolution of 2400 dpi, and contains about 3 MB of pixels whose bit value is 1.

SUMMARY OF THE INVENTION

It is therefore an object of the present invention to provide a method of and an apparatus for easily extracting contour line data from line drawing data, and a workstation with a contour line extracting function.

Another object of the present invention is to provide a method of and an apparatus for extracting contour line data from line drawing data within a short period of time, and a workstation with a contour line extracting function.

Still another object of the present invention is to provide a method of and an apparatus for extracting contour line data from line drawing data with a small memory capacity, and a workstation with a contour line extracting function.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 5 is a flowchart of a subroutine in the operation sequence shown in FIG. 4;

DETAILED DESCRIPTION OF THE DRAWINGS

Figure 1:
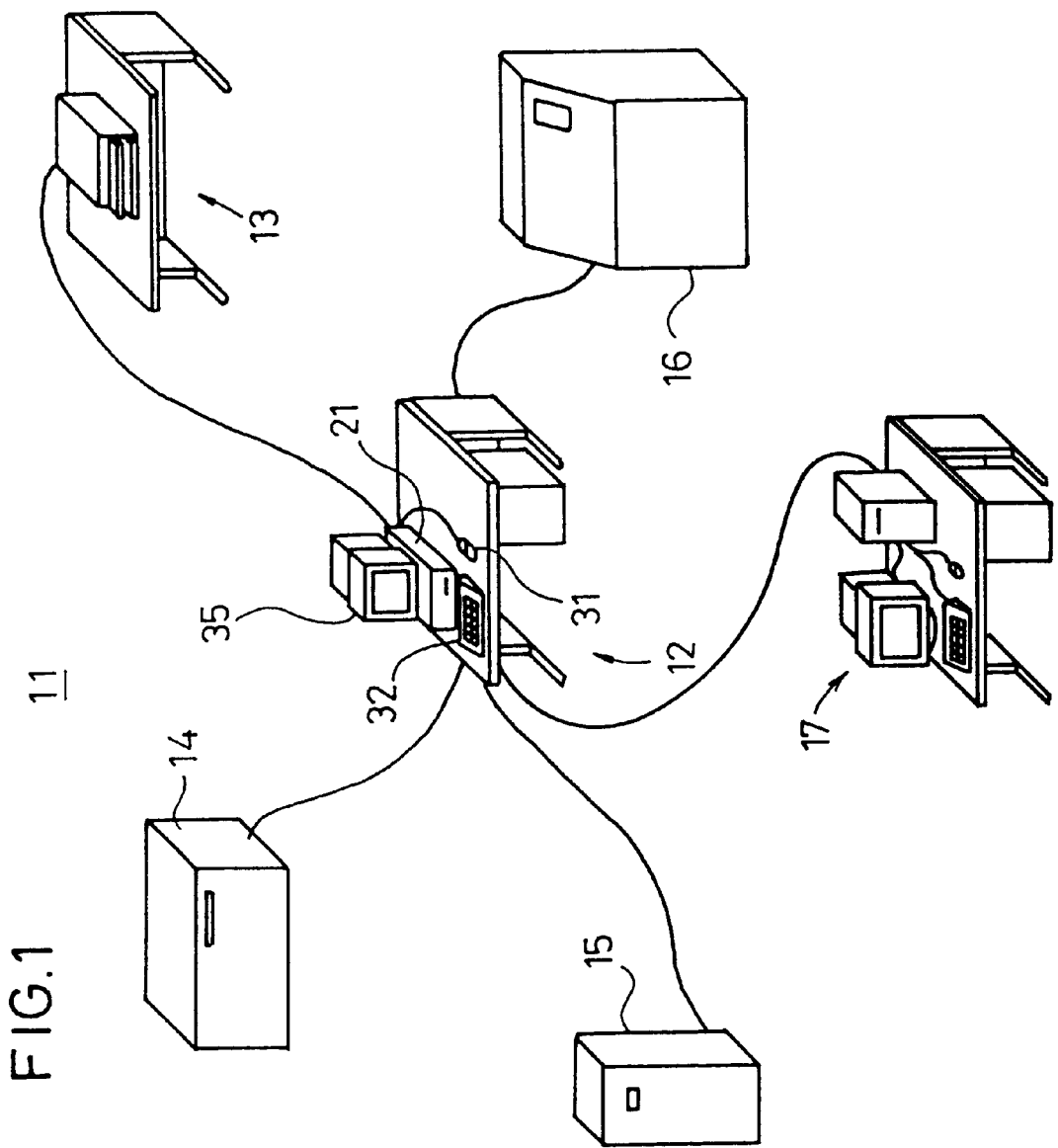
FIG. 1 is a perspective view of an electronic make-up system which incorporates the principles of the present invention.

FIG. 1 shows in perspective an electronic make-up system 11 which incorporates the principles of the present invention.

As shown in FIG. 1, the electronic make-up system 11 has a workstation 12 comprising a computer as a main controller for the electronic make-up system 11. The workstation 12 may alternatively comprise a personal computer, for example, which is capable of computerized processing.

The electronic make-up system 11 includes a PS (PostScript) printer 13 connected as an image output device to the workstation 12. The PS printer 13 is capable of printing proof sheets of relatively low image quality at a lost cost.

The electronic make-up system 11 also includes a monochromatic scanner 14 and a color scanner 15 which are connected as image input devices to the workstation 12, and a film printer 16 connected as an image output device to the workstation 12.

The monochromatic scanner 14 reads a subject carrying a line drawing by raster-scanning one line by one line, and supplies line drawing data as a monochromatic image to the workstation 12.

The color scanner 15 reads a subject carrying a color image by raster-scanning one line by one line, and supplies image data (including color line drawing data) separated in C (cyan), M (magenta), Y (yellow), and K (black) to the workstation 12.

A plurality of editing workstations 17 are connected to the workstation 12 by a communication interface such as Ethernet or the like. Postscript (PS) language data, TIFF (Tagged Image File Format) data, EPS (Encapsulated PostScript) data, etc. are transmitted and received between the editing workstations 17 and the workstation 12. Line image data, etc. supplied from the editing workstations 17 can be processed by the workstation 12.

Each of the editing workstations 17 electronically assembles line drawing data and image data (image data may be considered to include line drawing data) supplied from the monochromatic scanner 14 and the color scanner 15 via the workstation 12, converts the assembled data into postscript language data as page description language data, and supplies the postscript language data to the workstation 12. The workstation 12 interprets the supplied postscript language data, and supplied the data to the film printer 16 and/or the PS printer 13.

The film printer 16 comprises an image setter and a film processor, for example, and outputs printing films of high image quality. Press plates are produced from the printing films, and set in a printing press. Inks are applied to the press plates in the printing press, and transferred from the press plates to a sheet of paper, thereby producing a printed material.

Figure 2:
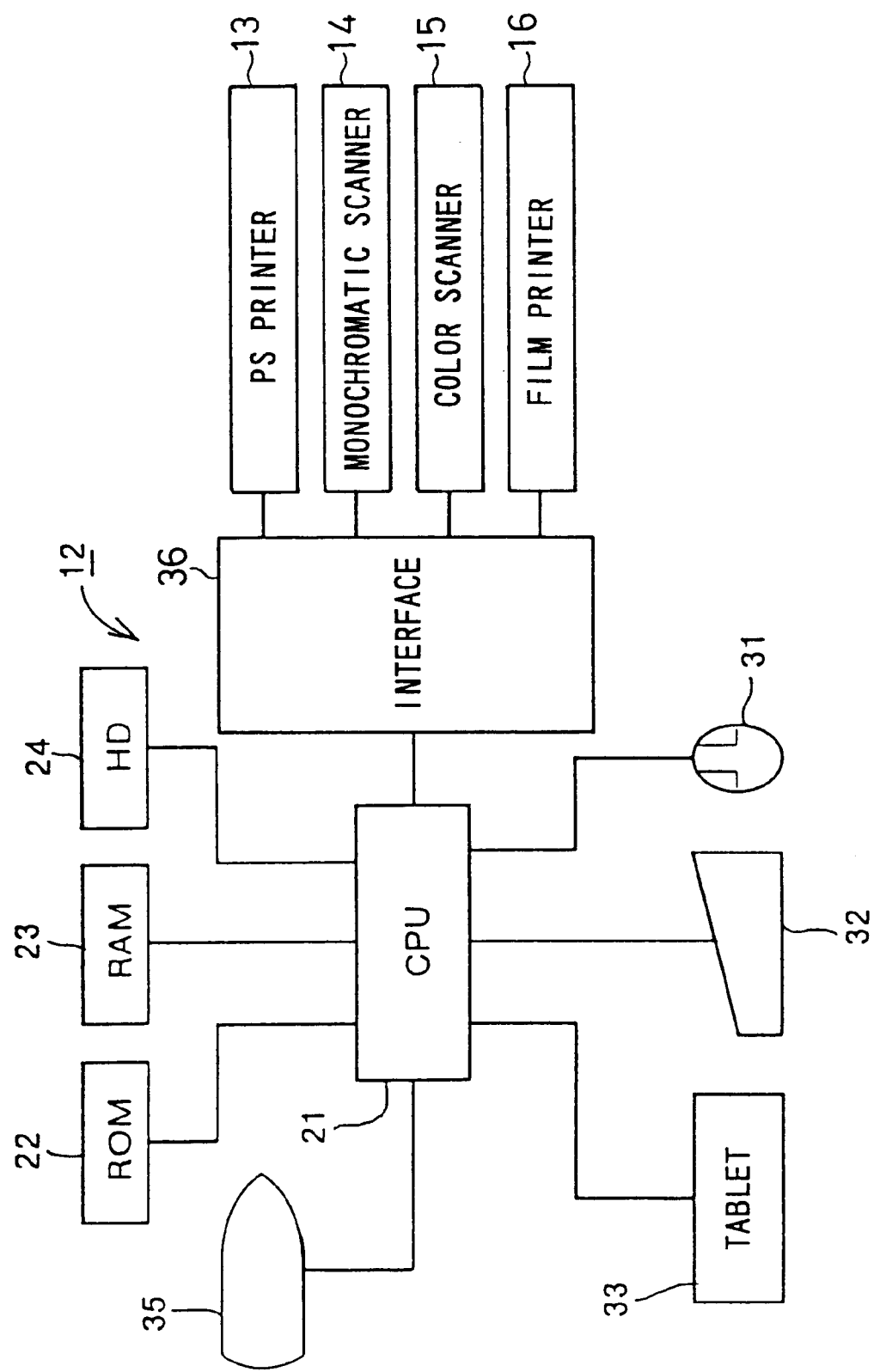
FIG. 2 is a block diagram of a workstation of the electronic make-up system shown in FIG. 1.

FIG. 2 shows in block form the workstation 12 in detail. As shown in FIG. 2, the workstation 12 comprises a CPU (Central Processing Unit) 21 which functions as control means, processing means, decision means, etc. The workstation 12 also has a ROM (Read-Only Memory) 22 storing a system program and other data, a RAM (Random-Access Memory) 23 for storing working data, and an HD (Hard Disk) 24 for storing an application program and various data including image data. The ROM 22, the RAM 23, and the HD 24 are connected to the CPU 21.

To the CPU 21, there are also connected a mouse 31 serving as a data input unit or a pointing device, a keyboard 32, and a tablet 33. A display 35 serving as an image display unit is connected to the CPU 21.

The PS printer 13, the monochromatic scanner 14, the color scanner 15, and the film printer 16 are connected to the CPU 21 through an interface 36.

Figure 3:
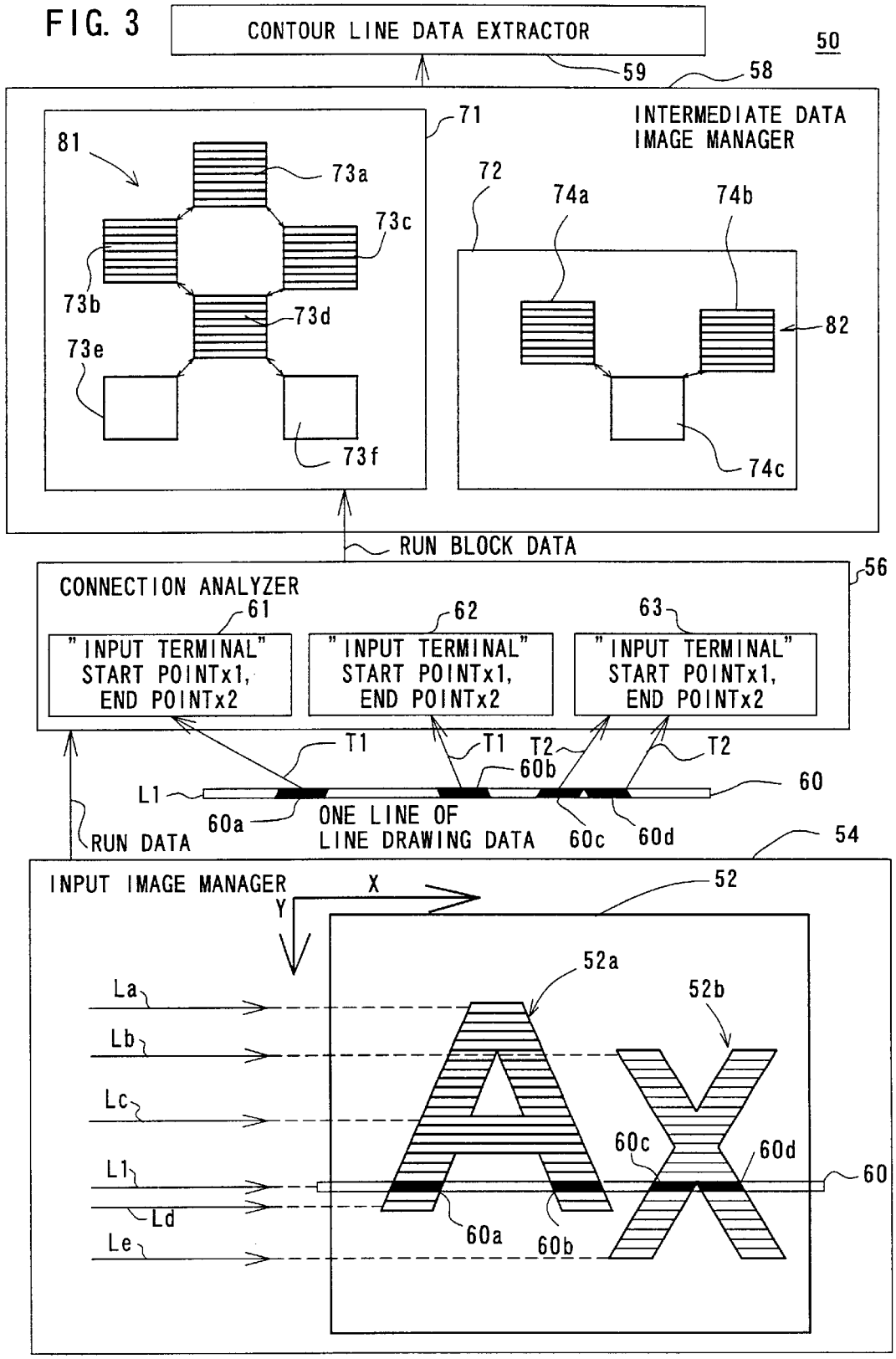
FIG. 3 is a block diagram illustrative of functions that are performed by the workstation.

FIG. 3 shows in block form a contour line extracting processor 50. The contour line extracting processor 50 is constructed as functions that are performed by the workstation 12 including the CPU 21, the ROM 22, the RAM 23, the HD 24, etc.

The contour line extracting processor 50 comprises an input image manager 54, a connection analyzer 56 connected to the input image manager 54, an intermediate data image manager 58 connected to the connection analyzer 56, and a contour line data extractor 59 connected to the intermediate data image manager 58. Contour line data extracted by the contour line data extractor 59 is stored in the HD 24.

The input image manager 54 stores and manages a line drawing (also called line drawing data) comprising run data (line drawing data of one line and compressed by run-length coding) 60 to be processed which is schematically shown that is present on an extension of the arrow indicating a line L1 to be processed, and reads every line of line drawing data 52. Stated otherwise, the input image manager 54 reads run data of the line drawing data 52. The line drawing data 52 contains line drawing data 52a indicative of a character "A", line drawing data 52b indicative of a character "X", and data having a value "0". The line drawing data 52a, 52b are binary data.

The run data 60, i.e., one line of line drawing data, may occasionally contain a plurality of run data, as described later on. In FIG. 3, the run data 60 comprises four run data 60a, 60b, 60c, 60d.

Since the line drawing data 52 comprises the run data 60, etc., reading every line of the line drawing data 52 is also referred to as reading every line of the run data 60. The run data 60 that has been read is supplied from the input image manager 54 to the connection analyzer 56.

The connection analyzer 56 checks the run data 60 read every line by the input image manager 54 for its connected relationship to a preceding line (which has been read immediately prior to the present line), confirms that the run data 60 represents the same color, and stores the run data 60 in input terminals 61, 62, 63. The input terminals 61, 62, 63 comprise a buffer memory (also referred to as "run buffer") of a fixed length capable of temporarily storing 64 items of run data 60. A start point x1 and an end point x2 of finally inputted run data serve as a connection terminal. The connection analyzer 56 divides the supplied run data 60 into blocks in each of which present and preceding lines of run data are connected to each other in one-to-one correspondence, adds connection information between the blocks of run data to the blocks, and supplies the blocks with the added joint information as run block data to the intermediate data image manager 58.

The intermediate data image manager 58 serves to manage the run block data separately. The run block data include blocks of run data such as run block data 73a, divided from the line drawing data 52, and connection information between the run block data 73a and other blocked run data, e.g., run block data 73b, 73c. The connection information indicates, for example, that run data of the lowermost line of the run block data 73a is connected to run data of the uppermost lines of the run block data 73b, 73c, and also indicates, for example, that run data of the uppermost line of the run block data 73b is connected to run data of the lowermost line of the run block data 73a and run data of the lowermost line of the run block data 73b is connected to run data of the uppermost line of the run block data 73d.

In the intermediate data image manager 58, run block data represented by blank squares, such as run block data 73e, 73f, are empty run block data where no run data has been stored. The intermediate data image manager 58 contains same color area managers 71, 72 which hold run block data of the same line drawing color. Specifically, the same color area managers 71, 72 hold respective intermediate data 81, 82 that comprise the run block data 73a–73f with the connection information added thereto and the run block data 74a–74c with the connection information added thereto. When the intermediate data 81, 82 are completed, stated otherwise, when the reading of the line drawing data 52 is completed and the empty run block data 73e, 73f, 74c are filled in the same color area managers 71, 72, the intermediate data 81, 82 are read by the contour line data extractor 59.

The contour line data extractor 59 traces the connection information between the interconnected run block data 73a–73f, 74a–74c of the intermediate data 81, 82 thereby to extract contour line data of the desired line drawing data 52 (line drawing data 52a and line drawing data 52b).

Figure 4:
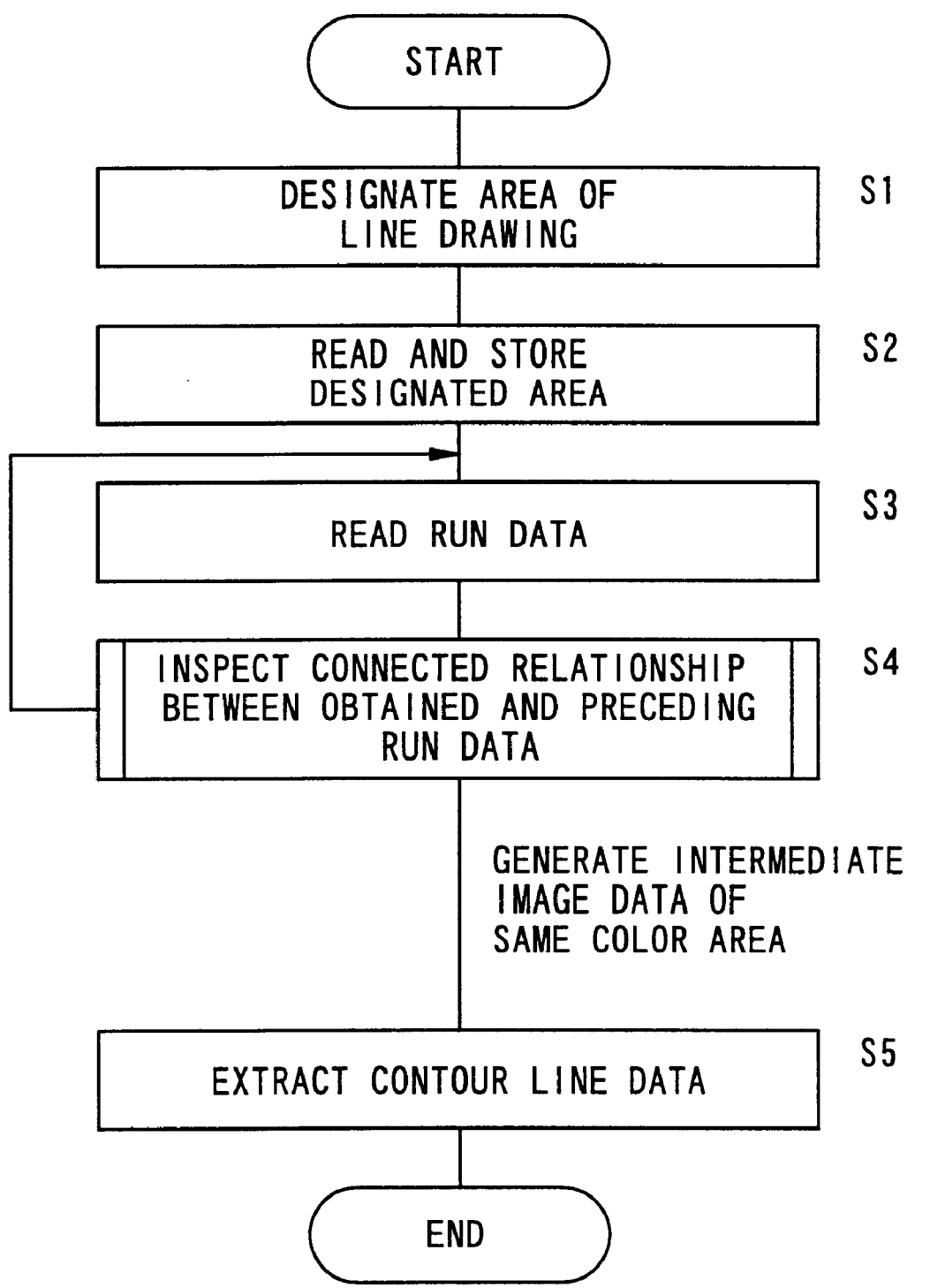
FIG. 4 is a flowchart of an operation sequence of the workstation.

Operation of the workstation 12 will be described in detail with reference to FIGS. 4 and 5. The CPU 21 and the contour line extracting processor 50 including the CPU 21 play a principal control role.

The area of an image (line drawing) whose contour line is to be extracted is designated on the display 35 using the mouse 31 as area designating means, the area having a length X=x in the direction indicated by the arrow X (see FIG. 3) and a length Y=y in the direction indicated by the arrow Y, in a step S1.

The designated area (x×y) is read and stored into the input image manager 54 as line drawing 52 from which contour line data is to be extracted, in a step S2. The line drawing 52 is composed of run data, i.e., run data compressed by run-length coding, as described above. Each run data comprises a start point X1, an end point X2, and color data. In this embodiment, the line drawing data 52a indicative of the character "A" and the line drawing data 52b indicative of the character "X" are data of different colors. However, they may be data of one color. Therefore, one line of line data may occasionally contain a plurality of run data.

The input image manager 54 successively reads lines of the line drawing data 52 from the uppermost line thereof, and transfers each line of run data, i.e., each line of line drawing data (image data), to the connection analyzer 56 in a step S3. In FIG. 3, the line drawing data 60 of the line L1 to be processed is extracted and schematically shown. The line drawing data 60 may be considered to have four run data, i.e., two run data 60a, 60b relative to the character "A" in the line drawing data 52a and two run data 60c, 60d relative to the character "X" in the line drawing data 52b.

The connection analyzer 56 inspects a connected relationship between the run data 60a–60d of the obtained line drawing data 60 and run data representing line drawing data of a line preceding the line L1 of line drawing data 60 in a step S4. The run data of the preceding line has been stored as the input terminals 61–63. Therefore, start and end points X1, X2 of each of the run data 60a–60d and start and end points X1, X2 of each of the input terminals 61–63 are compared with each other to check which of the run data 60a–60d is connected to which of the input terminals 61–63, i.e., to check whether there is the same coordinate data on the X axis between the run data of the present and preceding lines, i.e., two successive lines.

Each of the input terminals 61–63 is of a fixed length capable of temporarily storing 64 items of run data 60. Run data which has been stored most recently, i.e., the start and end points X1, X2 of the preceding line of run data, is stored as an input terminal for confirming connection of the presently read run data 60a–60d.

FIG. 5 shows a subroutine representative of the inspection process in the step S4 in greater detail.

The connection analyzer 56 determines one of connected forms T1–T5, described below, to decide how the presently inputted run data 60, i.e., the present line of run data 60, is connected to the input terminals 61–63, in a step S41.

The connected form T1 means that one input terminal in the connection analyzer 56 and one of the run data, to be connected, of one line read from the line drawing data 52 in the step S3 are connected to each other. For example, as shown in FIG. 3, the input terminal 61 is connected to the run data 60a, and the input terminal 62 is connected to the run data 60b. If the number of items of run data stored in the input terminal to which they are connected is 63 or smaller (NO in a step S42), then the connected run data are stored in the input terminal which has been decided as being connected in a step S43, and the information of the input terminal is updated in a step S44. That is, the information of the start and end points X1, X2 of the input terminal is updated into the information of newly inputted run data.

If there remains line drawing data 52 not read into the input image manager 54 (YES in a step S45), then control goes back to the step S3 to read a next line of run data. If there remains no line drawing data 52, the subroutine in the step S4 is finished, and contour line data is extracted in a step S5 (described later on).

If the number of items of run data stored in the input terminal to which they are connected is 64 (YES in the step S42), then a run data (also referred to as run block data), described later on, is identified and outputted to the intermediate data image manager 58 in a step S46. Thereafter, the information of the input terminal which has stored the 64 items of run data is cleaned in the step S44. Then, the step S45 and following steps are executed. Each input terminal can store up to 64 items of run data because of a trade-off experimentally discovered between increasing the number of run data stored thereby to reduce the number of generated run blocks but increase the number of memories of the input terminals and reducing the number of run data stored thereby to increase the number of generated run blocks but reduce the number of memories of the input terminals.

Specifically, it was experimentally found that the number of 64 items of run data was optimum for a typical line drawing having an A4 size and a resolution of 1200 dpi or 2400 dpi. With a fixed value for the number of items of run data, the efficiency of processing memory data with the computer is en increased. The number of items of run data may be 32 or 128, rather than 64, for the ease of data handling in the binary notation.

The connected form T2 means that a plurality of run data are connected to one input terminal. For example, as shown in FIG. 3, the input terminal 63 is connected to the two run data 60c, 60d. In this case, no data is inputted to the input terminal 63, but run data stored in a run buffer of the input terminal 63 up to the present time is identified as run block data 73a, etc. and outputted to the intermediate data image manager 58 in a step S47.

In the connected form T2, empty run block data 73e, 73f, for example, are generated in a step S48.

The intermediate data image manager 58 generates connection information of the empty run block data 73e, 73f with respect to the preceding run block data. Specifically, information indicating that the empty run block data 73e, 73f are connected to the run block data 73e is generated in a step S49.

In the connected form T2, as many input terminals as the number which is equal to the number of items of run data connected, from which 1 is subtracted, are added in a step S50, and the information of the input terminal is updated in the step S44. Specifically, the data of the input terminal 63 is cleared, and the information of start and end points X1, X2 of run data to be connected is inputted to the input terminal 63 and the added input terminals. The step S45 and following steps are carried out in the same manner as with the connected form T1.

The connected form T3 means that one run data is connected to a plurality of input terminals. For example, one run data of a first line of an intermediate horizontal line "-" of the character "A" in a line Lc to be processed is connected to two run data of a preceding line including the lower end of a shape "^" at the top of the character "A". In this case, no new run data is inputted to a plurality of input terminals, and run data stored in the run buffer of each of the input terminals are identified as different run block data, e.g., the run block data 74a, 74b, in the step S47. Then, the intermediate data image manager 58 generates empty run block data, e.g., the run block data 74c, in the step S48. Connection information between the run block data 74a, 74b, 74c is added in the step S49. Furthermore, one of the input terminals is left, and the other input terminals are deleted in the step S50. The data of the left input terminal is cleared, after which the information of start and end points X1, X2 of one run data to be connected to the left input terminal is inputted in the step S44. The step S45 and following steps are carried out in the same manner as with the connected form T1.

The connected form T4 means that there is no run data to be connected to an input terminal. For example, run data of the lowermost end of the character "X" of the line image data 52b, in a line Le to be processed, corresponds to run data not to be connected to an input terminal. In this case, run block data is identified and outputted in a step S51. At this time, since lines remain to be processed from a line next to the line Le, control returns from the step S45 to the step S3. Inasmuch as no run data remains below the line Le in the line drawing data 52 shown in FIG. 3, control skip the steps S51, S44, S45 and goes to the step S5 (described later on).

The connected form T5 means that there is no input terminal to be connected to inputted run data. For example, a line La at the top of the character "A" and a line Lb at the top of the character "X" correspond to such inputted run data. The connection analyzer 56 generates a new input terminal with respect to start and end points X1, X2 and color data of the inputted run data, and requests the intermediate data image manager 58 to generate a new same color area. The intermediate data image manager 58 generates a new same color area manager in a step S52. At this time, the new input terminal stores information indicative of which run block data in the new same color area manager blocks of run data are to be outputted to.

The above process generates intermediate data 81, 82 composed of connected run block data separated in same color areas in the intermediate data image manager 58. At the end of the inspection in the step S4, the contents of the run block data of the intermediate data 81, 82 are all filled.

With respect to the intermediate data 81, 82 in the respective same color area managers 71, 72, coordinates are traced downwardly at the left-hand side of the run block data, i.e., at the start point S1 of the run data, and coordinates are traced upwardly at the right-hand side of the run block data, i.e., at the end point S1 of the run data, for thereby obtaining contour line data of the intermediate data 81, 82 in the respective same color areas, i.e., contour line data of the respective line drawing data 52a, 52b, easily within a short period of time.

The above operation will be described schematically as a whole below with reference to FIGS. 6A, 6B, and 6C.

Figure 6A:
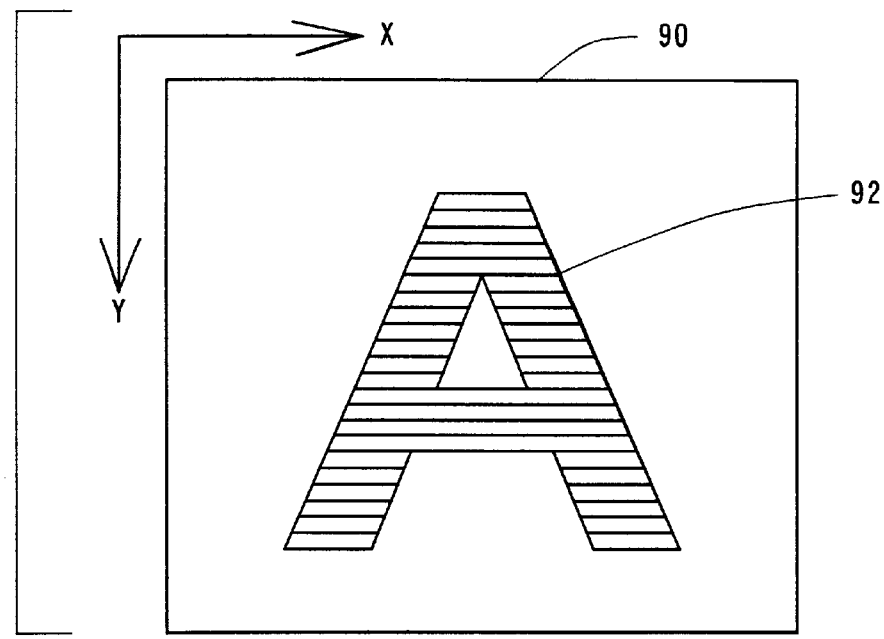
FIG. 6A is a diagram showing line drawing data of a character A.

As shown in FIG. 6A, the input image manager 54 reads, line by line, run data 92 produced by compressing image drawing data 90 according to run-length coding, and the connection analyzer 56 inspect run data connected to a preceding line.

Figure 6B:
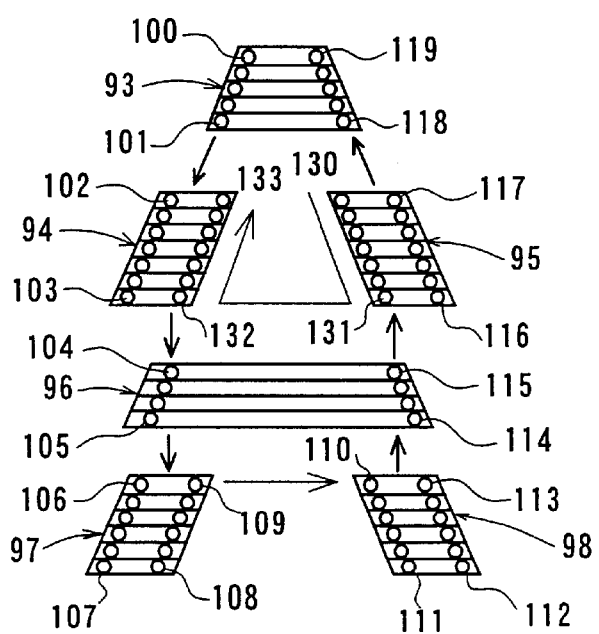
FIG. 6B is a diagram showing run block data divided from the line drawing data of the character A.
Figure 6C:
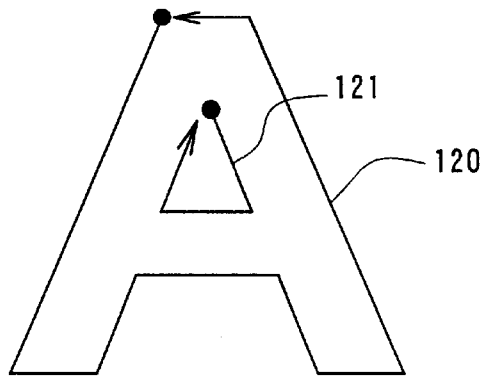
FIG. 6C is a diagram showing contour line data of the character A.
Figure 7:
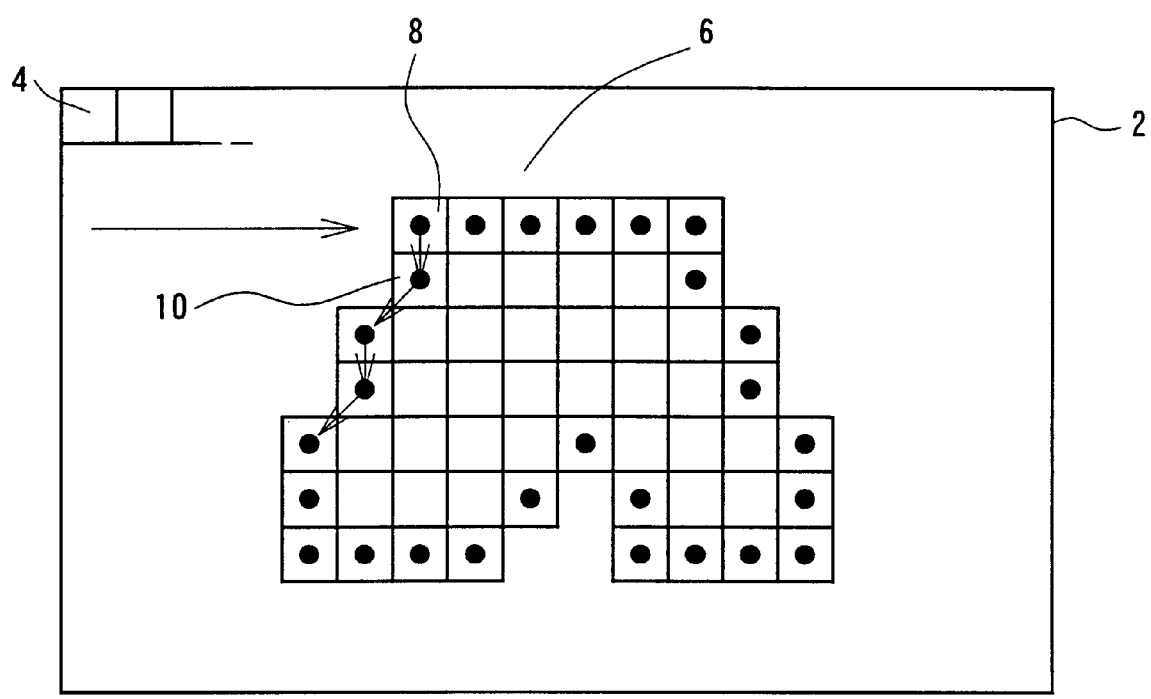
FIG. 7 is a diagram illustrative of a conventional process of extracting contour line data from line drawing data.

Based on the result of the inspection, as shown in FIG. 6B, the run data is divided into blocks in each of which present and preceding lines of run data are connected to each other in one-to-one correspondence, and connection information between the run data in the blocks is added. The intermediate data image manager 58 manages the blocks of run data with the connection information as run block data 93–98.

When the run block data 93–98 are generated, if upper and lower lines of run data are connected in one-to-one correspondence (the connected form T1), then information of start and end points X1, X2 of the run data is added to a run buffer of a fixed length, i.e., an input terminal described above.

If the number of items of run data connected in one-to-one correspondence exceeds the fixed length of the run buffer, or the run data are connected in one-to-many correspondence (the run block data 94, 95 are connected to the run block data 93, the run block data 97, 98 are connected to the run block data 96: the connected form T2) or in many-to-one correspondence (the run block data 96 is connected to the run block data 94, 95: the connected form T3), then the array of run data up to the preceding line are registered as run block data, and connection information (link information) with respect to new run block data is added. For high-resolution line drawings, since run data are actually joined in one-to-one correspondence in most cases, a simple process of inspecting one run data for a connection to the preceding line and holding the run data in the fixed length is prevalent. Therefore, it is possible to generate the run block data 93–98 of the line drawing data 90 in a short period of time, i.e., at a high speed.

With respect to the run block data 93–98 thus generated, the connection information is traced by reading coordinates downwardly at the left-hand end of the line block data 93–98 and reading coordinates upwardly at the right-hand end of the line block data 93–98, for thereby producing contour line data of the line drawing data 90.

Specifically, in FIG. 6B, coordinates are traced from a start point 100 on the upper left end of the run block data 93 to a start point 101 on the lower left end thereof→(the arrow→indicates connection information) from a start point 102 on the upper left end of the run block data 94 to a start point 103 on the lower left end thereof→from a start point 104 on the upper left end of the run block data 96 to a start point 105 on the lower left end thereof→from a start point 106 on the upper left end of the run block data 97 to a start point 107 on the lower left end thereof→from an end point 108 on the lower right end of the run block data 97 to an end point 109 on the upper right end thereof→from a start point 110 on the upper left end of the run block data 98 to a start point 111 on the lower left end thereof→from an end point 112 on the lower right end of the run block data 98 to an end point 113 on the upper right end thereof→from an end point 114 on the lower right end of the run block data 96 to an end point 115 on the upper right end thereof→from an end point 116 on the lower right end of the run block data 95 to an end point 117 on the upper right end thereof→from an end point 118 on the lower right end of the run block data 93 to an end point 119 on the upper right end thereof→to the start point 100 on the upper left end of the run block data 93, for thereby obtaining coordinate data 120 (see FIG. 6C) of an outer profile of the line drawing data 90 (the run data 92).

Furthermore, coordinates are traced from a start point 130 on the upper left end of the run block data 95 to a start point 131 on the lower left end thereof→from an end point 132 on the lower right end of the run block data 94 to an end point 133 on the upper right end thereof, for thereby obtaining coordinate data 121 (see FIG. 6C) of an inner profile of the line drawing data 90.

For high-resolution line drawings, since the number of run block data are much smaller than the number of run data, the connection information can be traced in a highly short period of time. In the example shown in FIGS. 6A–6C, only the six run block data 93–98 may be traced. Even if the resolution of a line drawing is increased twice while the shape of the line drawing remains the same, the number of run block data 93–98 does not change insofar as the run block data 93–98 are run data within the run buffers of the input terminals.

According to the present invention, as described above, the contour line of a line drawing is not traced by checking bit map data for every pixel, but is extracted from run data of line drawing data. Therefore, a memory capacity used for extracting contour line data may be reduced, and contour line data can be extracted within a short period of time, i.e., at a high speed.

Reduction of a processing time will be described in specific detail. It has heretofore taken about 90 seconds to extract contour line data from line drawing data which is of an A4 size, has a resolution of 1200 dpi, and contains about 1 MB of pixels whose bit value is 1. According to the present invention, however, but it takes only about 10 seconds to extract such contour line data. As a result, the processing time has reduced to about 1/9. Furthermore, it takes about 12 seconds according to the present invention to extract contour line data from line drawing data which is of an A4 size, has a resolution of 2400 dpi, and contains about 3 MB of pixels whose bit value is 1, whereas it has heretofore taken about 400 seconds to extract such contour line data. Therefore, the processing time has reduced to about 3/100.

According to the present invention, moreover, start point coordinate data of run data of run block data are read downwardly (or upwardly), and end point coordinate data thereof are read upwardly (or downwardly). Therefore, a combination of the start point coordinate data and the end point coordinate data thus read is obtained as contour line data.

Although a certain preferred embodiment of the present invention has been shown and described in detail, it should be understood that various changes and modifications may be made therein without departing from the scope of the appended claims.

What is claimed is:

1. A method of extracting a contour line, comprising the steps of:

reading, line by line, run data representative of a line drawing;

for each run data of a line, determining a start point coordinate data and an end point coordinate data of the run data, and storing the start point coordinate data as a first reference point and storing the end point coordinate data as a second reference point;

comparing the first reference point and the second reference point respectively with a start point coordinate data and an end point coordinate data for run data of a succeeding line and determining a connection exists when coordinates of the first and second reference points or coordinates between the first and second reference points overlap with coordinates of one of a start point coordinate data and end point coordinate data of run data of the succeeding line;

storing the start point coordinate data and the end point coordinate data of the succeeding line as the first reference point and the second reference point, respectively;

storing connector information between run data when a connection exists between run data of different lines until a predetermined number of connector information has been stored;

managing the plurality of run data corresponding to the predetermined number of connector information as run block data;

determining connection information between interconnected run block data; and tracing the connection information between the interconnected run block data to extract a contour line data.

2. A method according to claim 1, wherein said connection information comprises information indicative of whether there is run block data connected to each of uppermost and lowermost lines of run data of one of the run block data, and indicative of whether there is run block data connected to each of the uppermost and lowermost lines, of which run block data the run block data is connected.

3. A method according to claim 1, wherein said step of tracing the connection information comprises the steps of reading downwardly or upwardly the start point coordinate data of each of the run data of the run block data and reading upwardly or downwardly the end point coordinate data of each of the run data of the run block data.

4. A method according to claim 1, wherein said run block data contains color data.

5. An apparatus for extracting a contour line, comprising:

an input image manager for reading, line by line, run data from line drawing data;

a connection analyzer for each run data of a line, determining a start point coordinate data and an end point coordinate data of the run data, and storing the start point coordinate data as a first reference point and storing the end point coordinate data as a second reference point, comparing the first reference point and the second reference point respectively with a start point coordinate data and an end point coordinate data for run data of a succeeding line and determining a connection exists when coordinates of the first and second reference points or coordinates between the first and second reference points overlap with coordinates of one of a start point coordinate data and end point coordinate data of run data of the succeeding line, storing the start point coordinate data and the end point coordinate data of the succeeding line as the first reference point and the second reference point, respectively, storing connector information between run data when a connection exists between run data of different lines until a predetermined number of connector information has been stored; and managing the plurality of run data corresponding to the predetermined number of connector information as run block data; and a contour line data extractor for tracing connection information between interconnected run block data to extract a contour line data.

6. An apparatus according to claim 5, wherein said connection analyzer comprises means for confirming run data representing same colors when dividing the run data into blocks in each of which present and preceding lines of run data are connected to each other in one-to-one correspondence.

7. An apparatus according to claim 6, further comprising an intermediate data image manager connected between said connection analyzer and said contour line data extractor, for dividing the run block data from said connection analyzer into run block data of same colors and managing the run block data of same colors.

8. An apparatus according to claim 5, wherein said contour line data extractor comprises means for reading downwardly or upwardly the start point coordinate data of each of the run data of the run block data and reading upwardly or downwardly the end point coordinate data of each of the run data of the run block data.

9. An apparatus according to claim 7, wherein said contour line data extractor comprises means for reading downwardly or upwardly the start point coordinate data of each of the run data of the run block data and reading upwardly or downwardly the end point coordinate data of each of the run data of the run block data.

10. An apparatus according to claim 5, wherein said connection analyzer has a memory for storing the run block data, said memory having a memory capacity capable of storing 64 items of run data.

11. An apparatus according to claim 5, wherein said connection analyzer comprises means for inspecting connected forms including a first connected form in which one run data of a read line is connected to one run data of a preceding line, a second connected form in which a plurality of run data of a read line are connected to one run data of a preceding line, a third connected form in which one run data of a read line is connected to a plurality of run data of a preceding line, a fourth connected form in which no run data of a read line is connected to run data of a preceding line, and a fifth connected form in which no run data of a preceding line is connected to read run data.

12. A workstation having a contour line extracting function, comprising:

a computer;

an image input device connected to said computer;

an image output device connected to said computer; said computer comprising:

an input image manager for reading, line by line, run data from line drawing data;

a connection analyzer for each run data of a line, determining a start point coordinate data and an end point coordinate data of the run data, and storing the start point coordinate data as a first reference point and storing the end point coordinate data as a second reference point, comparing the first reference point and the second reference point respectively with a start point coordinate data and an end point coordinate data for run data of a succeeding line and determining a connection exists when coordinates of the first and second reference points or coordinates between the first and second reference points overlap with coordinates of one of a start point coordinate data and end point coordinate data of run data of the succeeding line, storing the start point coordinate data and the end point coordinate data of the succeeding line as the first reference point and the second reference point, respectively, storing connector information between run data when a connection exists between run data of different lines until a predetermined number of connector information has been stored; and managing the plurality of run data corresponding to the predetermined number of connector information as run block data; and a contour line data extractor for tracing connection information between interconnected run block data to extract a contour line data.

13. The method of claim 1, wherein run block data comprises four or more items of run data.

14. The method of claim 13, wherein run block data comprises 64 items of run data.

15. The apparatus of claim 5, wherein said connection analyzer has a memory for storing the run block data comprising 64 items of run data.

16. The apparatus of claim 5, wherein for each line of run data, said connection analyzer is operable to determine a plurality of start point coordinate data and end point coordinate data corresponding to a plurality of run data of a line and further determines connectivity between the plurality of run data of the line with run data of a succeeding line based on overlapping conditions relative to the plurality of start point coordinate data and end point coordinate data.

17. The method of claim 1, wherein run block data comprises run data from more than four successive lines.

18. The apparatus of claim 5, wherein the connector analyzer provides run block data comprising run data from more than four successive lines.

19. The workstation of claim 12, wherein the connector analyzer provides run block data comprising run data from more than four successive lines.

* * * * *